United States Patent

Bleth et al.

[11] Patent Number: 5,580,304
[45] Date of Patent: Dec. 3, 1996

[54] METHOD AND APPARATUS FOR VENTING SLAUGHTERED POULTRY

[75] Inventors: David Bleth, Fort Meyers; Gerald Banks, Lehigh Acres; Todd Coppedge, Estero; William DeWitt, Cape Coral; Oliver Hahn, Fort Meyers; Maurice Hunking, Lehigh Acres; Wayne Mullineaux, Alva; Manfred Peters, Fort Meyers; Richard Smith, Lehigh Acres; Todd Walter, Fort Meyers, all of Fla.

[73] Assignee: Baader North America Corporation, Fort Myers, Fla.

[21] Appl. No.: 374,949

[22] Filed: Jan. 18, 1995

[51] Int. Cl.$^6$ ................................................. A22C 21/06
[52] U.S. Cl. ...................................................... 452/122
[58] Field of Search .................................. 452/122, 109, 452/120

[56] References Cited

U.S. PATENT DOCUMENTS

| | | | |
|---|---|---|---|
| 2,795,815 | 6/1957 | Dahlberg | 452/122 |
| 2,943,346 | 7/1960 | Jensen | 452/122 |
| 4,023,237 | 5/1977 | Meyn | 452/122 |
| 4,257,142 | 3/1981 | Hathorn et al. | 452/122 |
| 4,265,001 | 5/1981 | Hathorn et al. | 452/120 |
| 4,486,720 | 12/1984 | Tieleman | 452/122 |
| 4,532,676 | 8/1985 | Simmons | 452/122 |
| 4,564,977 | 1/1986 | Schier et al. | 452/122 |
| 4,884,341 | 5/1989 | Baertlien | 30/123.3 |
| 5,123,871 | 6/1992 | Van Den Nieuwegaar et al. | 452/122 |
| 5,133,686 | 7/1992 | Van Den Nieuwegaar et al. | 452/122 |
| 5,181,878 | 1/1993 | Bekkers | 452/122 |

FOREIGN PATENT DOCUMENTS

| | | | |
|---|---|---|---|
| 0457408 | 11/1991 | European Pat. Off. | 452/122 |
| 8625835 | 2/1987 | Germany . | |

*Primary Examiner*—Willis Little
*Attorney, Agent, or Firm*—Morrison Law Firm

[57] ABSTRACT

Venting of a poultry carcass is carried out using a rotary cutter with a point sharpened tip end and point sharpened teeth cutting edges adjacent the cutting tip end while operating the cutter such that the tip end has a line speed in a range of about 36–52 meters/minute in consequence of which less useable meat is lost in the vent severing operation reflecting a significant saving and product recovery to the slaughterer. During the severing operation, a shroud can be positioned around the rotary cutter to confine contaminants such as fecal matter contained in and on the carcass from being spread on the carcass in the area around the vent. To assure proper registry of the anus of the carcass with the rotary cutter during venting, holder arms are use to lift and position the carcass in optimized held position thereof carcass relative to the cutter axis.

10 Claims, 7 Drawing Sheets

METHOD AND APPARATUS FOR VENTING SLAUGHTERED POULTRY

BACKGROUND OF THE INVENTION

The present invention relates to method and apparatus for venting slaughtered poultry in manner and with means as provide recovery of more useable carcass meat as well as lessening possibility of contaminating the carcass incident the venting.

A requirement of processing a poultry carcass involves venting the carcass, i.e., cutting out the vent area around the anus of the carcass and withdrawing the intestine to the exterior of the carcass preliminary to further processing steps in which complete evisceration takes place.

U.S. patents dealing with this subject of which were are aware include U.S. Pat. Nos. 2,795,815; 4,023,237; 4,564,977; 5,123,871 and 5,133,686. A drawback of these is that unnecessary loss of recoverable carcass meat can and does occur this being due principally to manner of operation of the rotary cutter with which the vent is severed. In part this involves a cutter speed and cutter contact time with the area adjacent the vent which produces chewing up of the meat, separating skin from leaf fat and disadvantage and loss ensuing from misregistration between the vent and the cutter so that cut through of the intestine takes place.

The present invention contemplates that by severing the vent in manner not heretofore recognized, a savings of as much as 5 grams of useable meat per carcass can be obtained. When it is considered that about seven billion chickens are slaughtered in the United States annually, simple arithmetic calculation shows that possibly as much as 70 million pounds of meat heretofore lost can be recovered and with this significant dollar profit to the processor.

Additional to direct economic loss attending venting is the problem that the operation of the cutter in making the venting cut can cause spread of a contaminant such as fecal matter onto carcass areas outside the vent area being removed, this contaminant thereby becoming a problem site on the carcass that must be dealth with otherwise it can remain a bacterial source that can lead to spoilage.

In making a vent cut, the rotary cutter has to be properly aligned relative to the carcass anus. If untoward misalignment does occur, the cutter can cut through the intestine adjacent the vent possibly releasing fecal matter onto the carcass exterior. Also, off line venting produces loss of useable meat.

OBJECTS AND SUMMARY OF THE INVENTION

Accordingly, it is an object of the invention to provide slaughtered poultry carcass venting methodology and apparatus which overcomes the drawbacks of the prior art.

It is a further object of the invention to provide a method for venting a slaughtered poultry carcass which results in saving more useable meat on the carcass leading to more profitable operation for the slaughterer.

Another object is to provide a method for venting a slaughtered poultry carcass which is less destructive of the area of the carcass around the vent leading not only to better meat recovery but also lessening chance of producing contamination to that area as well as minimizing chance of separating carcass skin from leaf fat during the operation.

It is a still further object of the invention to provide a vent severing device which serves to confine splatter of debris from a vent cutting operation on to parts of a carcass away from the vent area.

A yet further object is to provide apparatus for more surely and better positioning a poultry carcass at a venting station to align the carcass anus with the axis on which the rotary cutter used for cutting the vent operates.

In accordance with a method for severing a vent of a slaughtered poultry carcass, a probe having a tip end is moved in a downward direction through the vent to engage the poultry intestine and is then moved in an opposite direction to draw the intestine and carcass area adjacent the vent in said direction so a rotary cutter encircling the probe can be moved downwardly to engage the carcass and cut through the vent.

To optimize the cutting operation in respect of avoidance of loss of useable carcass meat and employing methodology of the invention, the rotary cutter is provided as one having a tip end section tapered in the direction a cutter tip end cutting edge that is point sharpened. The tip end section also has longitudinally extending cutting teeth and these have point sharpened cutting edges as well.

During cutting, the rotary cutter is rotated at a much higher speed than heretofore practiced, the speed being one such that a line speed of the tip end is one in a range about 36 to about 52 meters per minute. In one embodiment, the cutter has a tip end extremity circumference of about 70 millimeters.

By operating with a rotary cutter of the type aforesaid and at a tip end line speed in the range indicated, a sharper, faster less carcass fragmentizing cut is achieved and useable meat saving of up to about 5 grams per carcass can be realized, such weight of useable meat heretofore having been lost when using prior cutting methods.

The invention also provides a shroud for encircling the rotary cutter during the time of cutter cutting operation. The shroud desirably is a hollow cylinder which has a lower tip end, the upper end being closed except for a pass through opening in which a probe rod moves, the shroud which is movable independently of cutter movement being moved down to engage tightly the surface of a carcass adjacent area with the shroud lower tip end. By such engagement, the shroud establishes an enclosed zone in which the cutter operates and in consequence, carcass particle splatter and debris from the cutting is confined in the zone.

Features of the shroud construction include providing protuberant structure at its lower tip end which protuberant structure is sufficiently invasive of the carcass vent adjacent area surface to obviate or stop any tendency of the shroud to rotate while the cutter is rotating.

A bias force as, for example, applied with a spring acting on the shroud can be used to urge it in a downward direction against the carcass. The seal of the shroud lower tip end allows that by providing port means in the cutter body as well as in the probe rod which is hollow, connection of such rod hollow interior with a condition of vacuum can be employed to evacuate splatter and debris from the enclosed confinement zone.

The invention also provides a venting carcass alignment and holding unit for positioning and holding a carcass at a venting apparatus venting station to align the carcass anus centralized with respect to an axis of travel of the rotary cutter which severs the vent. This unit assures avoidance of off line anus presentation to the cutter with consequent useable meat loss and cut through of the intestine that creates unwanted contamination on the carcass.

This unit includes an upper stay member projecting radially from a support in close embrace of a carcass at the station and used to obviate carcass rotation during the venting operation. A back plate is fixed to the support structure below the upper stay member, the plate having lateral side end parts which bent in a radial direction relative to a central generally flat plate central part.

A lower holder member comprised of two spaced apart arms is pivotably mounted to the support structure and these arms are specially configure so that when pivoted from a lower extreme position to an upper extreme position, the arms engage the carcass and more particularly with arm fore end part that engage the carcass hip joints and thigh to urge the carcass vertically upwardly and radially inward firmly against the back plate, this urging fixing the carcass anus relative to the cutter axis. A cam follower carried on the lower holder member engages a motive movement transfer cam rotating about a central station axis to pivot the lower holder member up and down.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figures 1, 4:
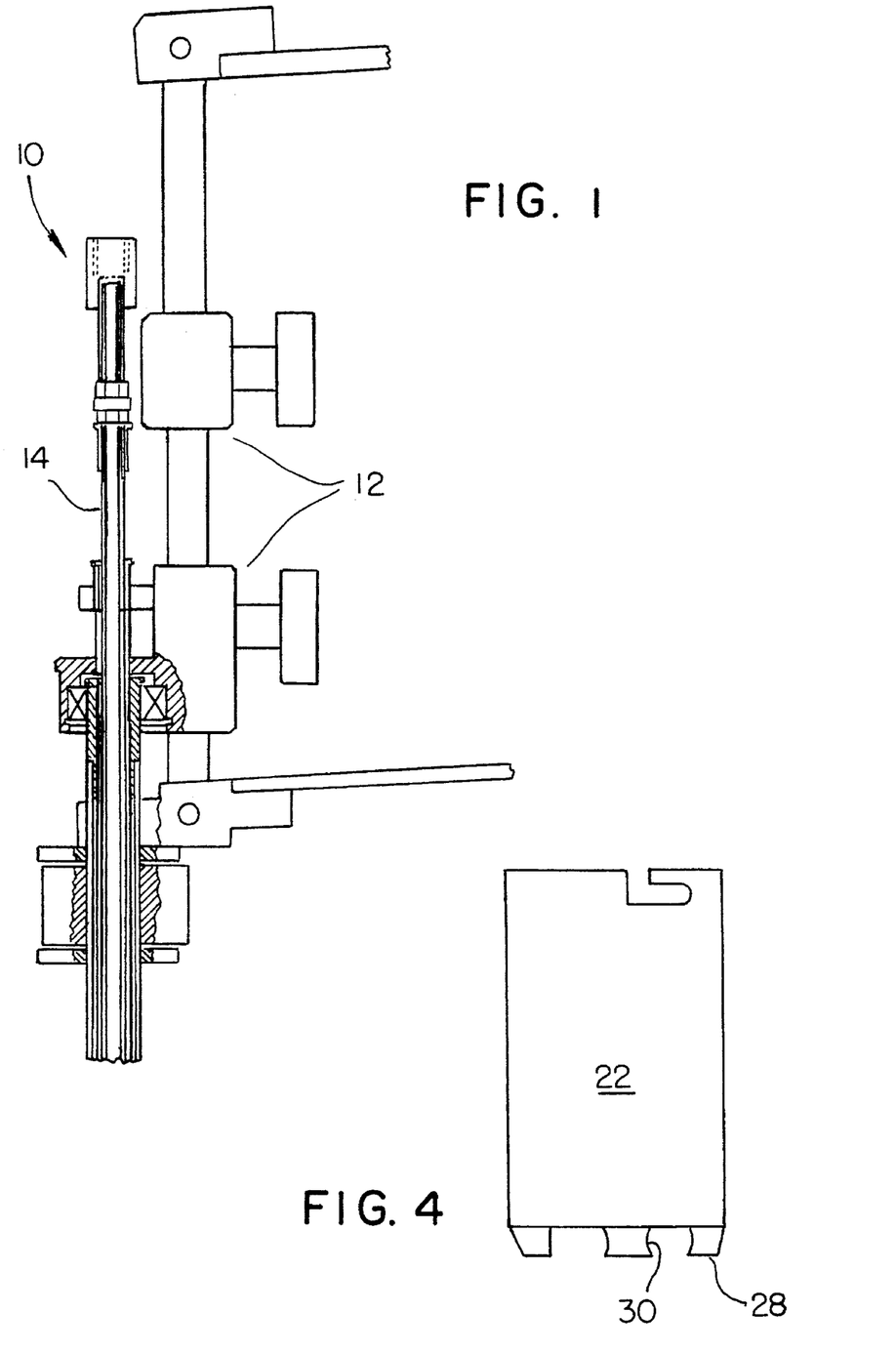
FIG. 1 is a vertical central sectional view of a venting unit with which the method of the invention can be practiced, some parts being shown in full and the venting unit lower part not being show.
FIG. 4 is an elevational view of the rotary cutter showing the sharp pointed cutter tip end cutting edge and the sharp pointed cutting edge of the cutter teeth.
Figure 2:
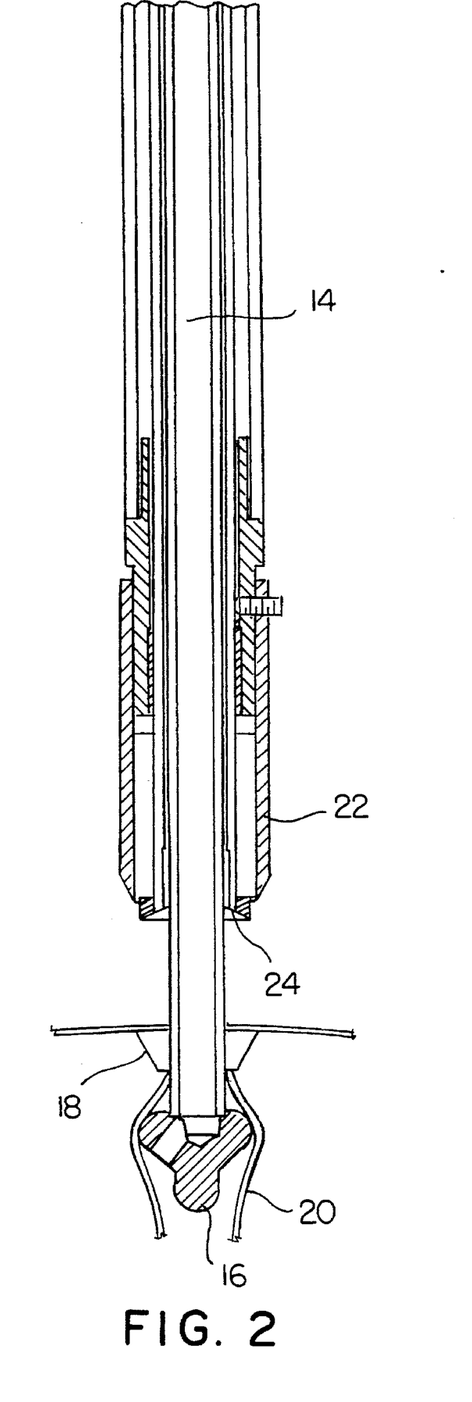
FIG. 2 is a fragmentary vertical sectional showing of the unit lower part and illustrating further the probe thereof having been moved through the carcass vent to engage the carcass intestine.

Referring to FIG. 1, a venting device is shown generally at 10 and includes mounting and driving structure at 12. The device includes a vertically movable hollow probe rod 14 fitted at its tip end with a probe 16 which has a bulbous configuration so it can enter a carcass vent 18 and engage an intestine 20 therewith as depicted in FIG. 2. Concentric with an exterior of the probe rod 14 is a rotary cutter 22, and within the cutter is an anvil 24, the anvil being spring loaded to extend downwardly when the probe is moved downwardly, the arrangement being such that retraction of the probe from a lowered position into the cutter effects retractive movement of the anvil counter to spring effect.

Figure 3:
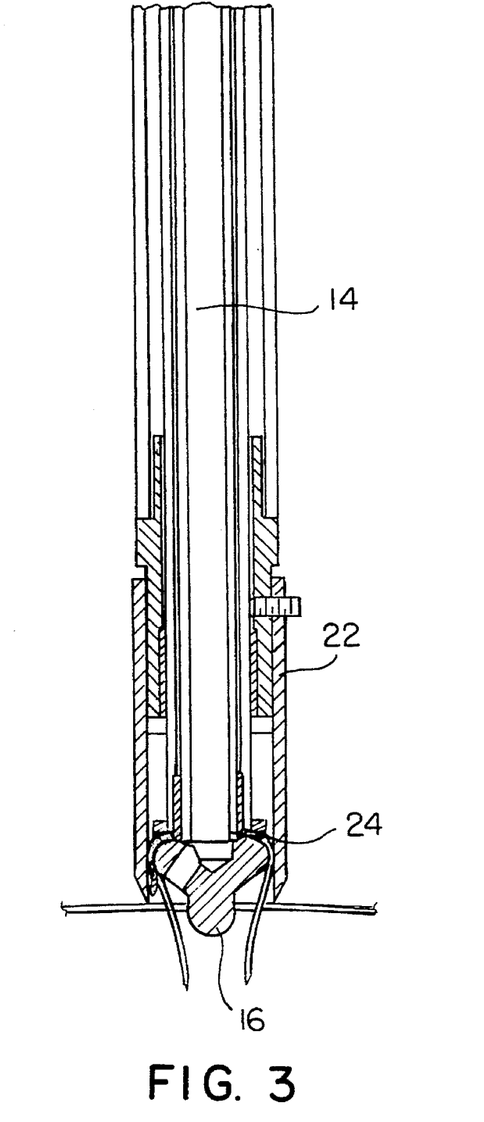
FIG. 3 is the same as FIG. 2 except the probe has been retracted to draw the vent and intestine into the cutter and the cutter having operated to cut through and sever the vent.

FIG. 3 shows a condition wherein the probe 16 has been retracted carrying the intestine 20 and vent 18 upwardly and the rotary cutter 22 operated to cut through the vent and sever it from the carcass. During probe retraction, the vent with intestine became clamped between the probe and the anvil and these were carried into the rotary cutter before actual cutting operation commenced. The result of cutting is as noted shown in FIG. 3.

During cutting, the rotary cutter is operated at much higher speed than used with prior venting cutter practice, such speeds being on the order of four to six times factor than in the prior art. This higher speed coupled with use of a rotary cutter 22 have both point sharpened cutting tip end and point sharpened longitudinal teeth cutting edges achieves a much sharper cut through the carcass vent causing less of a particularizing and disruption of the carcass, and hence less loss of useable meat.

The net result is useable meat recovery of up to about 5 grams per carcass. Further, separation of skin from leaf fat during cutting does not happen. At the lower operating speeds, the latter does occur and leaf fat goes into the cutter teeth and the cutting action of the prior cutter then involves useful meat loss producing tearing of the meat rather than the sharp well defined incision cut provide by the invention.

Operating speeds of the cutter, when can be produced with gear arrangements in the structure 12, or which could be by use of hydraulic drive, are such that a line speed of the cutter tip end will be in a range of about 36 to about 52 meters/minute. In practice and using a cutter with a tip circumference of about 70 mm operating at a line speed of about 40 meters/minute, excellent definition of sharpness of cut was effected and noticeable savings of useable meat was observed. In this instance, cutting was effected during a working arc movement of the cutting station about a carousel apparatus of about 26 degrees and with a total cutter revolution of 7.4 turns.

The results sought with the invention requires the line speeds indicated as well use of the particular rotary cutter. FIG. 4 shows cutter 22 has lower tip end section tapered or chamfered to a point sharpened tip as at 28, and that longitudinal cutting edges on teeth of the cutter be point sharpened as at 30.

Figure 5:
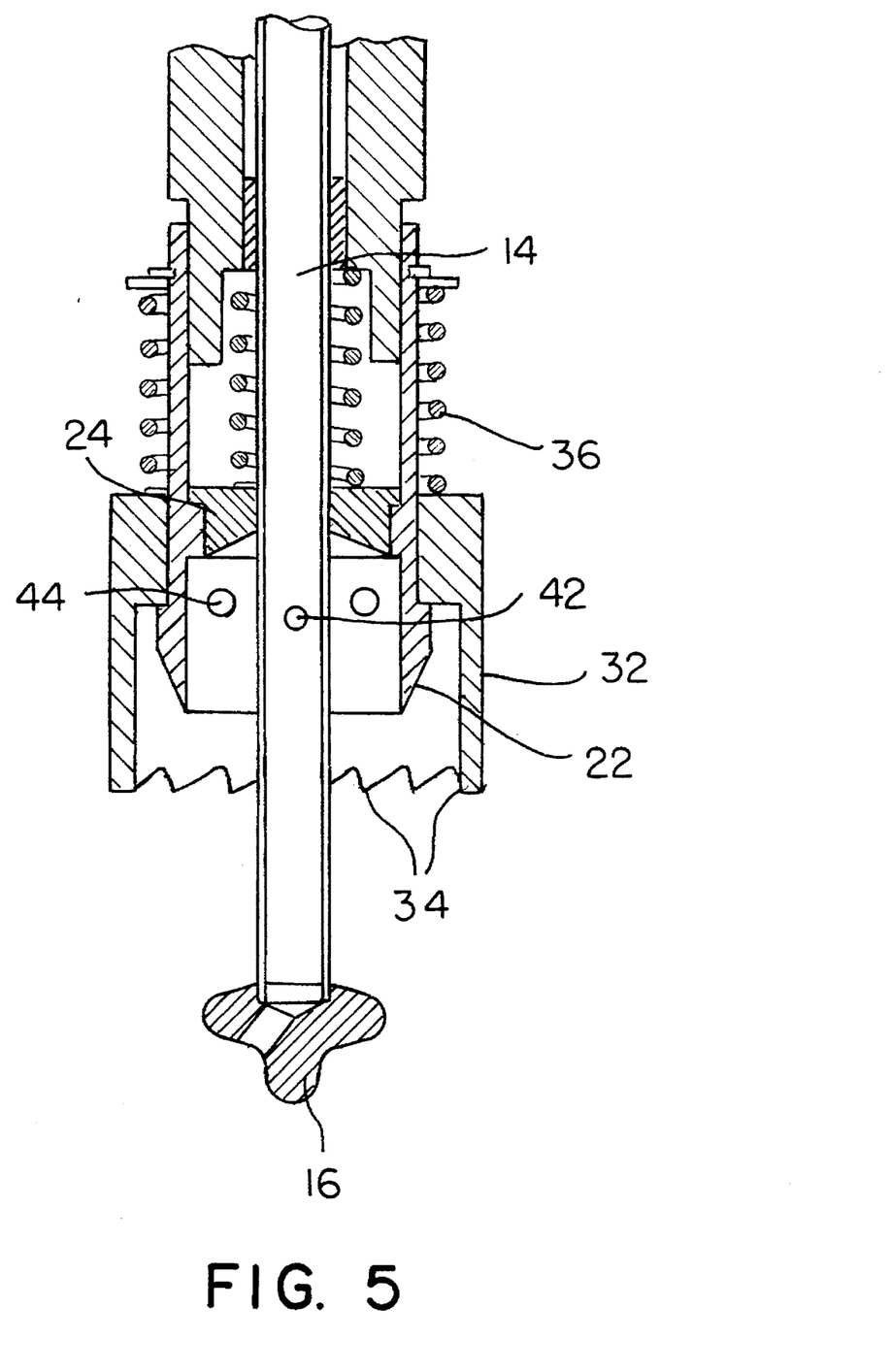
FIG. 5 is a vertical sectional view depicting the shroud which can encircle the rotary cutter while same is operating to cut so that cut particle splatter from the carcass can be confined immediate the vent and not be flung onto carcass surfaces remote from the vent where such splatter would contaminate the surfaces.
Figure 6:
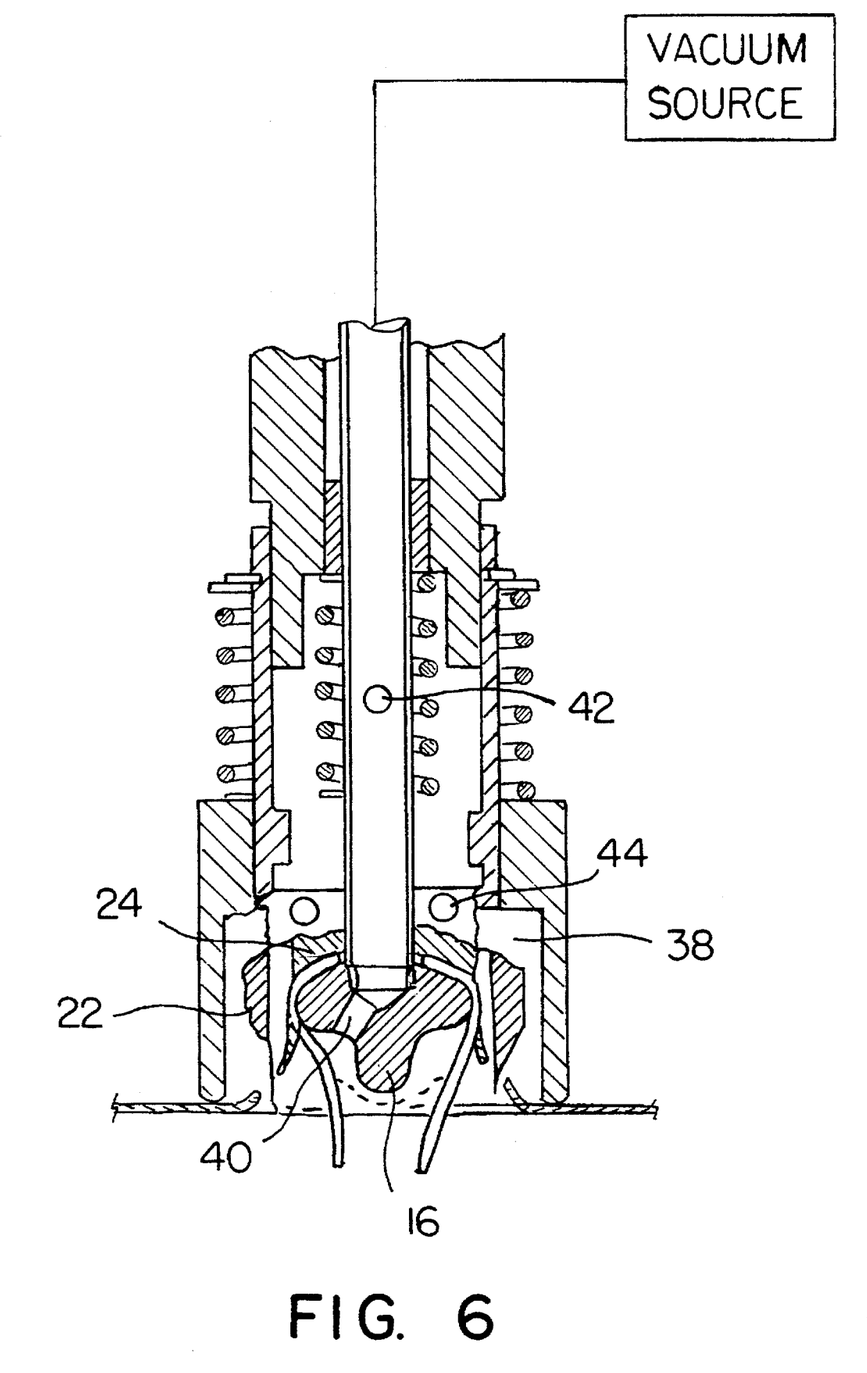
FIG. 6 shows the shroud in lowered confining zone establishing disposition about the rotary cutter.

FIGS. 5 and 6 show provision of a shroud 32 employed to eliminate possible adverse contamination of the carcass during cutting from fecal matter flung onto the carcass surface away from the vent area by erecting a barrier around the cutting zone for catching meat and fecal splatter. As seen from FIG. 5, components of the venter device are like those described earlier in that there is a concentrically arrayed assembly of a hollow cylindrical rotary cutter 22 and a hollow probe rod 14 having a probe 16 at its tip end. The invention provides a hollow cylindrical shroud 32 in the assembly concentrically and in an encirclement of the rotary cutter so the latter operates in cutting inside the former. The shroud will have a lower tip end as at 34 and the shroud will be movable axially independently of like cutter movement with the shroud lower tip end normally extending to a location which is proximal the farthest location to which the cutter tip end moves during a cutting operation. In this manner, the shroud tip end can engage the carcass surface and therewith establish a sealed zone about the cutter.

A compression coil spring 36 encircles the assembly remote from the shroud tip end but it engages a closed end of that element to bias the shroud against the carcass surface. Further, it is to be noted that the shroud tip end has protuberant structure, e.g., sinuous contour as at 36 which is sufficiently invasive of the carcass surface to create a stop effect on the shroud preventing it from rotating while the cutter is operating.

FIG. 6 shows the condition during and immediately after the vent has been severed. The space 38 inside the shroud and around the cutter is sealed from the outside. Probe 16 it is seen and is a known practice has a port 40 which is used to communicate a source of vacuum to the interior of the intestine as a measure to facilitate holding the probe engaged intestine on the probe. By providing a port means 42 in the probe rod and port means 44 in the cutter wall, a communication path can be established between the confinement zone or space around the cutter to evacuate cutting operation splatter and debris from the zone.

Referring now to FIGS. 7–10 and with continuing reference to all, there is depicted a venting station A of poultry processing apparatus generally designated as 50 at which carcass 52 having its legs 54 is hung by the legs from a moving track mounted shackle 56, so that vertically descending rotary cutter 22 can cut through the carcass vent. One of ordinary skill in the art will recognize that the apparatus is a carousel type, such being widely used in processing lines and that there will be plural venting stations on the carousel each with its own associated venting device and with a venting carcass alignment and holding unit, one such unit 60 as provided by the invention being described next.

Figure 7:
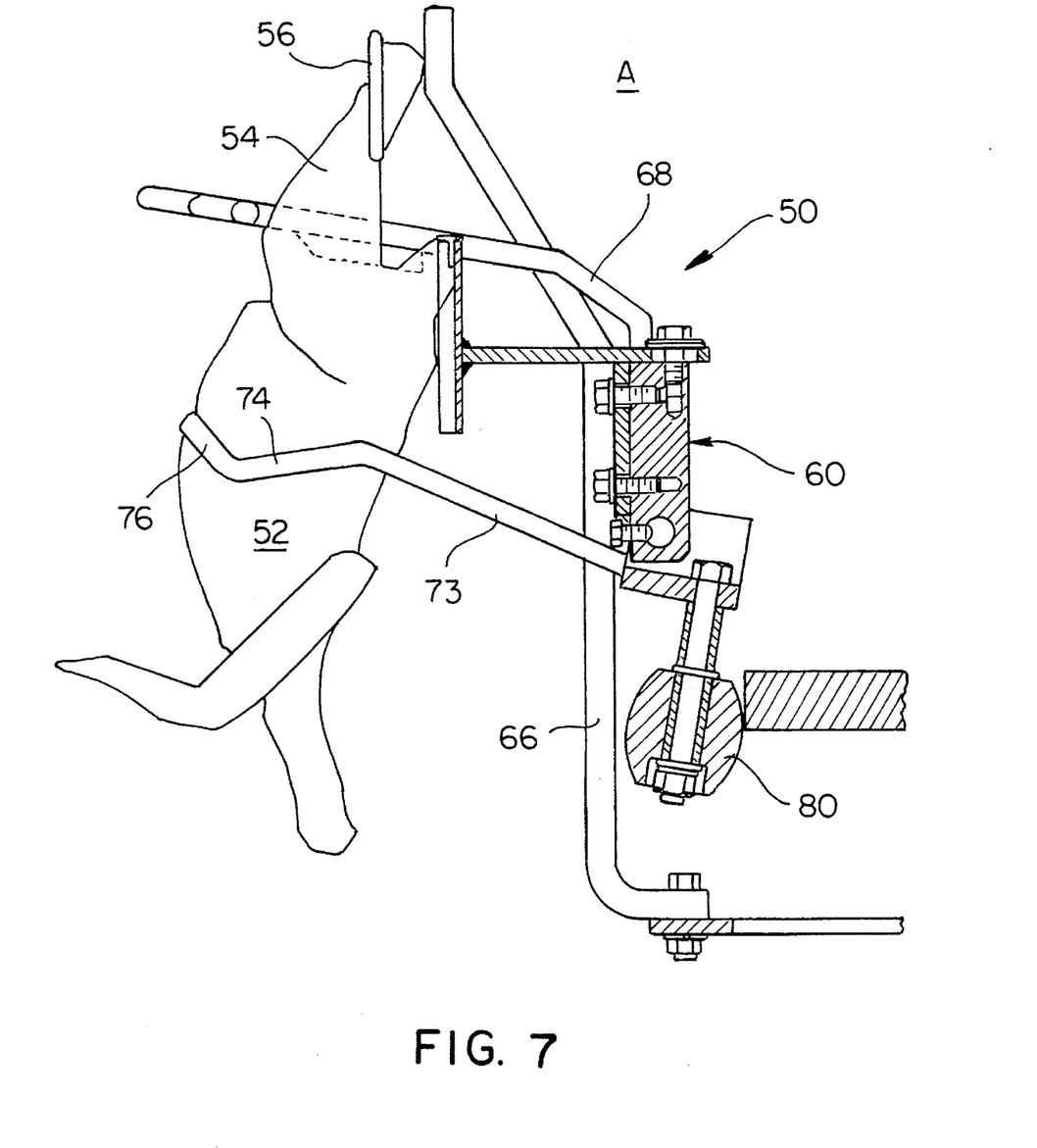
FIG. 7 is a side elevational showing of the venting carcass alignment and holding unit associated with a venting station on poultry processing apparatus, the lower holder member being in its lower extreme position.
Figure 8:
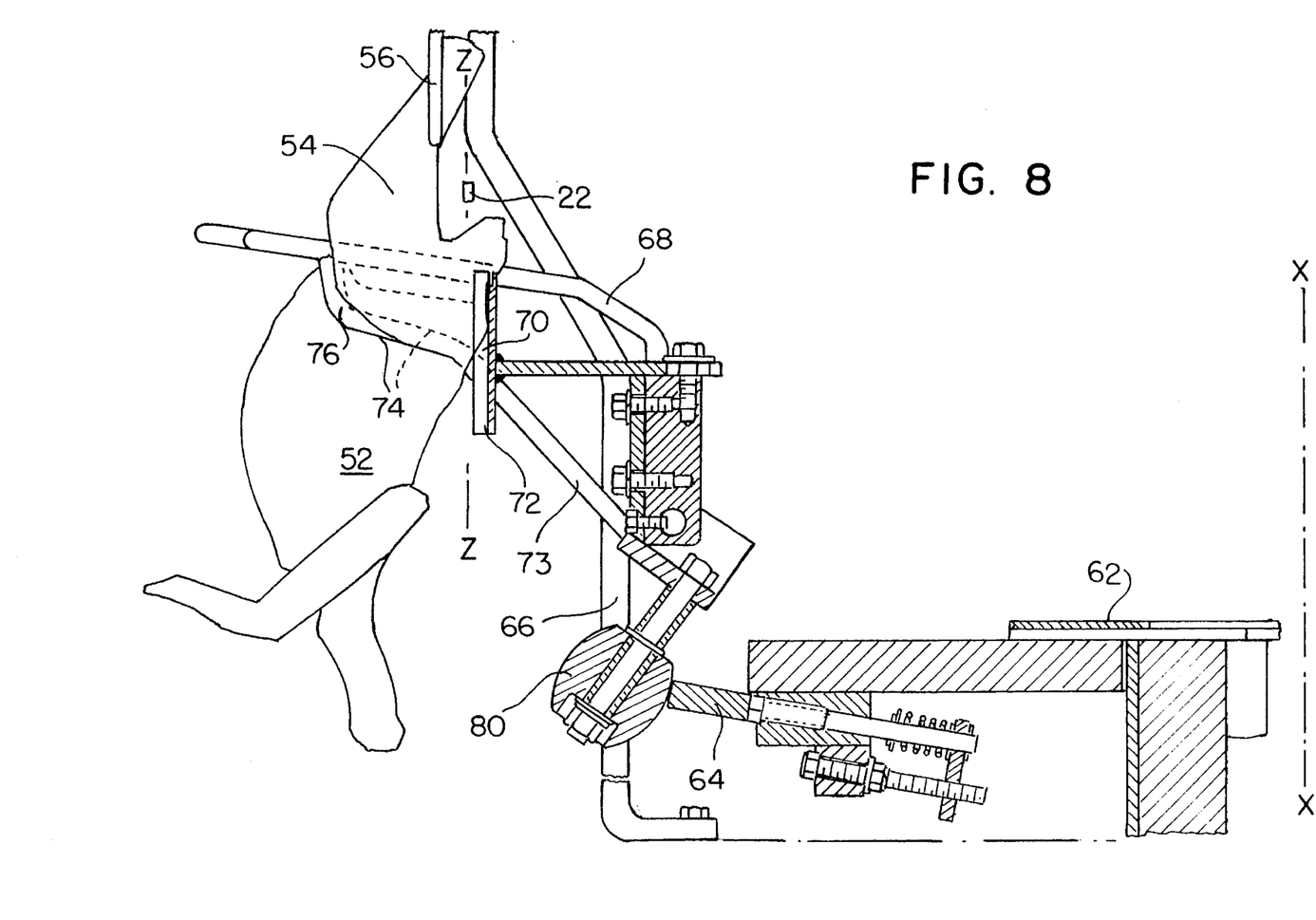
FIG. 8 is a view like FIG. 7 except the lower holder member has been moved to its upper extreme poultry urging position.

The carousel 62 rotates about a central axis X—X and mounts motive movement transfer means in the form of a circular cam 64. It also mounts supporting structure shown generally at 66. The alignment and holding unit 60 includes an upper stay member 68 extending radially from the support structure and passing between the carcass legs 54 to stay same and thus prevent carcass sway or rotative movement during the set up of the carcass for venting.

Figure 9:
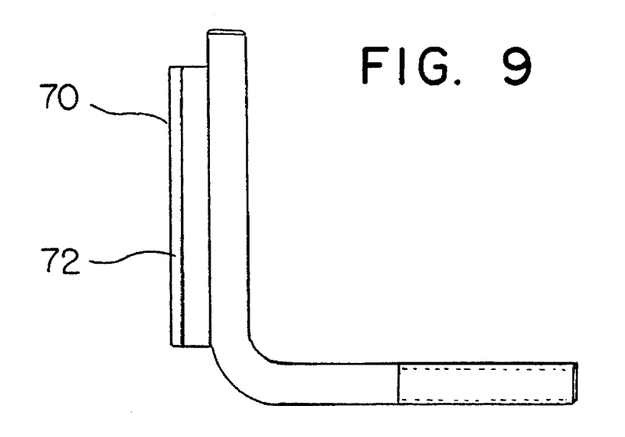
FIG. 9 is a side elevational view of the back plate.
Figure 10:
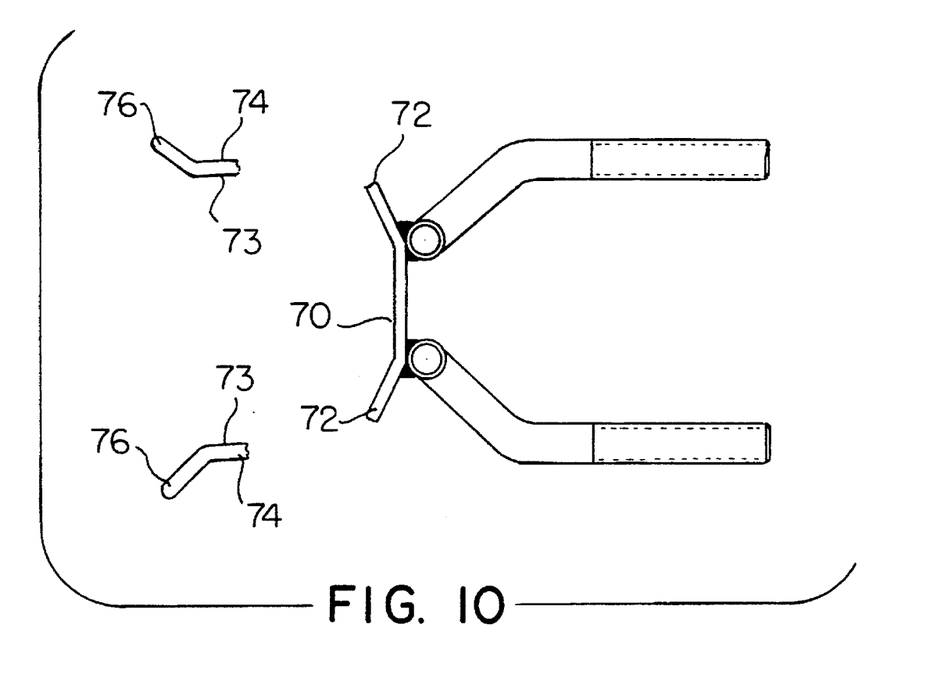
FIG. 10 is a top plan view of the back plate.

A back plate 70 also is fixed to the supporting structure below the stay member. It has a flat plate central part and opposite side end sections 72 angled in the radial direction, these being symmetrically arranged with the central part and with the stay member.

A lower holder member is comprised of a pair of spaced apart arms 73 which extend radially from the support structure and gird the carcass at its sides. The arms 73 are such mounted to the support structure that they have ganged pivoting movement from a lower extreme position to an upper extreme position as shown, respectively, in FIGS. 7 and 8.

The arms 73 are specially configured members having fore ends length runs which as seen in FIG. 7 each have a first run part 74 which is angled downwardly and transits into a sharply angled upwardly remaining run part 76, that remaining run part also laterally widening as seen from the fragment showing thereof in FIG. 10.

When the arms 73 are moved from lower to upper positions, the fore end runs thereof closely embrace the carcass, the first run parts 74 engaging the respective ones of the two carcass hip joints, and the remainder runs 76 engaging the thighs. The net effect of such engagements is to lift the carcass and urge it radially inwardly firmly against the back plate fixing the positioning of the carcass so that the vent is centralized with respect to a vent axis Z—Z at the station, this vent axis being the movement axis of the cutter 22 as well so that there is assured venting cutting of the carcass at precise desired location with no off center misalignment of the vent.

The repeatability of requisite alignment for the carcasses being vented at a station involves use of a rigid back plate in combination with the particularly configured arms 73 as the prime lifting and urging means. In prior positioning units, movable back plates as well as insufficiently angled lift arms too often led to improper alignment and consequent off target venting cutting.

A cam follower 80 connected with the lower holder member is utilized to pivot arms 73 in cooperation with the cam 64.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a method for the severing of a vent of a slaughtered poultry carcass incident removal of a carcass rectum and intestine to position same exteriorly of the carcass and which includes moving a probe having a tip end in a first direction through the vent to engage the intestine with the tip end, then moving the probe in an opposite direction to draw the engaged intestine and carcass area adjacent said vent in said opposite direction so that a cylindrically shaped rotating cutter encircling the probe can be moved in said first direction to engage the carcass area adjacent the vent and cut through the carcass adjacent area to sever the vent from the carcass, the steps of providing the rotating cutter as one with a point sharpened cutting tip end extremity and including a plurality of circularly spaced cutting teeth having point sharpened cutting edges extending longitudinally of the cutter, and rotating the cutter at a speed such that a line speed of the tip end extremity of the cutter is one in a range of about 36 to about 52 meters/minute to achieve a sharp, fast less carcass fragmentizing cut and thereby a saving of usable meat.

2. The method of claim 1 in which the cutter is operated at a speed such as to provide a tip end line speed of about 40 meters/minute.

3. The method of claim 1 further including pulling the vent adjacent carcass area holdingly against an anvil located remote from the probe tip end before the cutter is moved in the first direction.

4. The method of claim 1 in which the rotary cutter is provided as one having a tip end section tapered in the direction of said tip end, the cutting teeth being in said tapered end section.

5. The method of claim 1 in which the rotary cutter is provided as one having a tip end extremity circumference of about 70 millimeters.

6. In a device for severing a vent of a slaughtered poultry carcass incident removal of a carcass rectum an intestine to position same exteriorly of the carcass and which comprises a probe having a tip end which can be moved in a first direction through the vent to engage the intestine with the tip end and then withdrawn in an opposite direction to draw the engaged intestine and carcass area adjacent the vent in said opposite direction, and a rotary cutter having a cutting tip end exteriorly encircling the probe, the cutter being movable in said first direction to bring it into cutting engagement with the carcass area adjacent the vent to cut through said adjacent area whereby the vent is severed from the carcass, a shroud having an inner circumference substantially greater that the outer circumference of said rotary cutter and encircling the rotary cutter and supported for movement codirectionally but independently of said cutter, the shroud having a tip end normally extending axially in said first direction at least to a location which is beyond proximal and the farthest location to which the cutter tip end location is moved during a cutting operation so that the shroud tip end can tightly engage a surface of the carcass vent adjacent area and therewith establish an enclosed zone between said circumferences within which the cutter tip end operates, for confinement therein of carcass particle splatter and debris produced during cutting of the vent.

7. The vent severing device of claim 6 further comprising bias means engaged with said shroud and operable to urge said shroud in said first direction for maintaining tight engagement of the tip end thereof with the carcass vent adjacent area surface.

8. The vent surface of claim 7 in which the tip end of the shroud is provided with protuberant structure sufficiently invasive of the carcass vent adjacent area surface under impetus of said bias means to counter any tendency of the shroud to rotate while the rotary cutter is rotating.

9. The vent severing device of claim 6 in which the rotary cutter and the shroud are hollow coaxially arranged cylindrical elements, an inner wall surface of the shroud being spaced from an external wall surface of the cutter to define said enclosed zone, the probe being an elongated hollow rod passing centrally axially through said cutter and said shroud.

10. The vent severing device of claim 9 in which the probe includes port means passing from the rod hollow interior to an external surface thereof, the rotary cutter including port means communicating an internal wall surface thereof with its external wall surface so that during cutting operation of said cutter and with the tip end of the shroud tightly engaged with the carcass vent adjacent area surface communication of the probe rod hollow interior with a condition of vacuum will be effective to evacuate particle splatter and debris presence from the enclosed zone through the port means of the cutter, through the port means of the probe rod and thence through the rod hollow interior for a disposal collection of same.

* * * * *

UNITED STATES PATENT AND TRADEMARK OFFICE
CERTIFICATE OF CORRECTION

PATENT NO.  :   5,580,304
DATED       :   December 3, 1996
INVENTOR(S) :   David Bleth et al It is certified that an error appears in the above-identified patent and that said Letters Patent is hereby corrected as shown below:

Col. 7, line 12, Claim 6:
delete "and", second occurrence and in its place insert --; said shroud being--.

Claim 6, line 16:
delete entire line and replace with --is beyond and proximal to the farthest location to which--.

Signed and Sealed this

Eighteenth Day of March, 1997

Attest:

BRUCE LEHMAN

Attesting Officer

Commissioner of Patents and Trademarks